(12) United States Patent
Jiang et al.

(10) Patent No.: US 12,262,095 B2
(45) Date of Patent: Mar. 25, 2025

(54) INFORMATION PRESENTATION METHOD AND APPARATUS, DEVICE AND STORAGE MEDIUM

(71) Applicant: Beijing Zitiao Network Technology Co., Ltd., Beijing (CN)

(72) Inventors: Haiqiang Jiang, Beijing (CN); Qi Wang, Beijing (CN); Shuo Wang, Beijing (CN); Yao Guo, Beijing (CN); Lei Wang, Beijing (CN); Liyue Ji, Beijing (CN); Zifeng Zhao, Beijing (CN); Xiaofan Gao, Beijing (CN); Hao Wang, Beijing (CN); Shuqin Jia, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/693,657

(22) PCT Filed: Sep. 21, 2022

(86) PCT No.: PCT/CN2022/120088
§ 371 (c)(1),
(2) Date: Mar. 20, 2024

(87) PCT Pub. No.: WO2023/051334
PCT Pub. Date: Apr. 6, 2023

(65) Prior Publication Data
US 2024/0334021 A1    Oct. 3, 2024

(30) Foreign Application Priority Data

Sep. 30, 2021  (CN) .......................... 202111165536.5

(51) Int. Cl.
*H04N 21/488*    (2011.01)
*H04N 21/442*    (2011.01)

(52) U.S. Cl.
CPC ... *H04N 21/4882* (2013.01); *H04N 21/44204* (2013.01)

(58) Field of Classification Search
CPC ......... H04N 21/4882; H04N 21/44204; H04N 21/4383; H04N 21/4542; G06F 16/438; G06F 16/44; G06F 16/432
See application file for complete search history.

(56) References Cited

U.S. PATENT DOCUMENTS 8,745,498 B2    6/2014  Rahman et al.
9,511,261 B2 *  12/2016  Clark .................... A61B 5/1118
(Continued)

FOREIGN PATENT DOCUMENTS

| CN | 105979325 | 9/2016 |
| CN | 107959886 | 4/2018 |

(Continued)

OTHER PUBLICATIONS

International Search Report and Written Opinion in International Appln. No. PCT/CN2022/120088, mailed on Dec. 20, 2022, 14 pages (with English translation).

(Continued)

*Primary Examiner* — Adil Ocak
(74) *Attorney, Agent, or Firm* — Fish & Richardson P.C.

(57) ABSTRACT

The present disclosure relates to an information presentation method and apparatus, a device and a storage medium. The method comprising: during a process of a preset application presenting a multimedia stream, detecting that a preset reminding event is triggered; presenting first multimedia content, wherein the first multimedia content includes first preset prompt content; and in a case where a switching operation acting on the first multimedia content by a current user is received, forbidding switching to second multimedia content, displaying first copywriting information, and play- (Continued)

ing first voice information matched with the first copywriting information, wherein the second multimedia content is the next multimedia content in the multimedia stream.

20 Claims, 4 Drawing Sheets

(56) References Cited

U.S. PATENT DOCUMENTS

| | | | |
|---|---|---|---|
| 2011/0145856 A1* | 6/2011 | Agarwal | H04N 21/25435 |
| | | | 725/32 |
| 2012/0131626 A1 | 5/2012 | Gutierrez | |
| 2013/0342309 A1 | 12/2013 | Jiang | |
| 2014/0013196 A1 | 1/2014 | White | |
| 2015/0161565 A1* | 6/2015 | Kraft | G06Q 10/00 |
| | | | 348/441 |
| 2015/0287089 A1 | 10/2015 | Lee | |
| 2015/0332576 A1 | 11/2015 | Son | |
| 2016/0315942 A1 | 10/2016 | Liu | |
| 2017/0180808 A1 | 6/2017 | Kageyama | |
| 2018/0359356 A1 | 12/2018 | Ren et al. | |
| 2020/0358967 A1* | 11/2020 | Lee | G10L 13/00 |
| 2021/0219023 A1 | 7/2021 | Sheng et al. | |
| 2023/0319366 A1 | 10/2023 | Xuan et al. | |

FOREIGN PATENT DOCUMENTS

| | | |
|---|---|---|
| CN | 108650402 | 10/2018 |
| CN | 109462770 | 3/2019 |
| CN | 109547633 | 3/2019 |
| CN | 110572714 | 12/2019 |
| CN | 111784271 | 10/2020 |
| CN | 112584224 | 3/2021 |
| CN | 112612598 | 4/2021 |
| CN | 112631480 | 4/2021 |
| CN | 112631496 | 4/2021 |
| CN | 113283350 | 8/2021 |
| CN | 113901239 | 1/2022 |
| JP | 2020171829 | 10/2020 |
| JP | 7583226 B2 | 11/2024 |
| KR | 20150116546 | 10/2015 |

OTHER PUBLICATIONS

Notice of Allowance in Chinese Appln. No. 202111165536.5, dated May 30, 2023, 6 pages (with English translation).
Office Action in Chinese Appln. No. 202111165536.5, dated Mar. 22, 2023, 19 pages (with English translation).
Pan, "Anti-addiction System Development Based on Android Smartphone," Proceedings of the 2016 3rd International Conference on Materials Engineering, Manufacturing Technology and Control (ICMEMTC 2016), Taiyuan, China, Feb. 27-28, 2016, 19-23, 5 pages.
Wei, "Tik Tok launched a new anti-addiction reminder video," Beijing Youth Daily, Sep. 2021, 13 pages (with English translation).
Extended European Search Report in European Appln No. 22874721.8, dated Aug. 14, 2024, 11 pages.
Notice of Decision to Grant in Japanese Appln. No. 2024-515591, dated Oct. 1, 2024, 7 pages (with English translation).
Office Action in Brazilian Appln. No. 112024006025, dated Sep. 28, 2024, 12 pages (with machine English translation).
Office Action in Singaporean Appln. No. 11202401918W, dated Sep. 27, 2024, 13 pages.
Decision to Grant a Patent for Japanese Application No. 2024-515591, mailed Oct. 1, 2024, 5 pages.

* cited by examiner

INFORMATION PRESENTATION METHOD AND APPARATUS, DEVICE AND STORAGE MEDIUM

CROSS-REFERENCE TO RELATED APPLICATIONS

This application is a US 371 National Application from PCT/CN2022/120088 filed Sep. 21, 2022, which claims the benefit of priority to Chinese Patent Application No. 202111165536.5, filed with the Chinese Patent Office on Sep. 30, 2021. The disclosure of the forgoing applications are incorporated herein by reference.

TECHNICAL FIELD

Embodiments of the present disclosure relate to the field of computer technology, and for example, to information presentation method and apparatus, device and storage medium.

BACKGROUND

With the rapid development of information technology and the popularization of mobile internet, applications can provide users with more and more network information, wherein the information recommendation function of the applications is favored by more and more users.

Applications usually recommend various multimedia contents to a user in a manner of pushing information streams, the multimedia contents in the information streams can be switched automatically or under the operation of the user, and the multimedia contents in the information streams are usually rich and huge in quantity, so that a phenomenon that the user is addicted to watching multimedia streams easily occurs, and it is necessary to remind the user; however, the information presentation solution in the related art is still imperfect, and needs to be improved.

SUMMARY

The embodiments of the disclosure provide an information presentation method and an apparatus, a storage medium and a device.

In a first aspect, an embodiment of the present disclosure provides an information presentation method, comprising:
during a process of a preset application presenting a multimedia stream, detecting that a preset reminding event is triggered;
presenting first multimedia content, wherein the first multimedia content includes first preset prompt content; and
in a case where a switching operation acting on the first multimedia content by a current user is received, forbidding switching to second multimedia content, displaying first copywriting information, and playing first voice information matched with the first copywriting information, wherein the second multimedia content is the next multimedia content in the multimedia stream.

In a second aspect, an embodiment of the present disclosure provides an information presentation apparatus, comprising:
a preset reminding event detection module, configured to, during a process of a preset application presenting a multimedia stream, detect whether a preset reminding event is triggered;
a presentation module, configured to present first multimedia content after detecting that the preset reminding event is triggered, wherein, the first multimedia content includes first preset prompt content; and
a reminding module, configured to, in a case where a switching operation acting on the first multimedia content by a current user is received, forbid switching to second multimedia content, display first copywriting information and play first voice information matched with the first copywriting information, wherein the second multimedia content is the next multimedia content in the multimedia stream.

In a third aspect, an embodiment of the present disclosure provides an electronic device, comprising a memory, a processor, and a computer program stored on the memory and executable on the processor, the processor, when executing the computer program, implements the information presentation method provided by the embodiment of the present disclosure.

In a fourth aspect, an embodiment of the present disclosure provides a computer readable storage medium having thereon stored a computer program, the program, when being executed by a processor, implements the information presentation method provided by the embodiment of the present disclosure.

DETAILED DESCRIPTION

Figure 1:
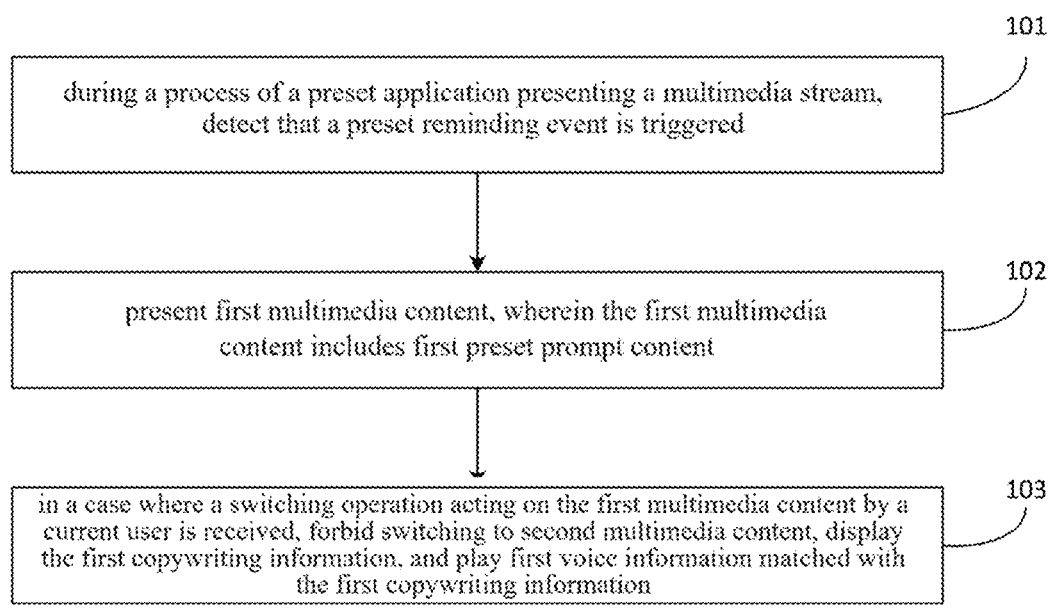
FIG. 1 is a schematic flowchart of an information presentation method provided by an embodiment of the present disclosure.

The embodiments of the present disclosure will be described below with reference to the accompanying drawings. While certain embodiments of the present disclosure are shown in the drawings, it should be understood that the present disclosure can be embodied in various forms and should not be construed as limited to the embodiments set forth herein, but rather these embodiments are provided for a more complete and thorough understanding of the present disclosure. It should be understood that the drawings and the embodiments of the present disclosure are for illustration purposes only.

It should be understood that the various steps recited in method embodiments of the present disclosure can be performed in a different order, and/or performed in parallel. Moreover, the method embodiments can include additional steps and/or omit performing the illustrated steps.

The term "comprise" and variations thereof as used herein are intended to be open-ended, i.e., "comprising but not limited to". The term "based on" is "based at least in part on". The term "one embodiment" means "at least one embodiment"; the term "another embodiment" means "at least one additional embodiment"; and the term "some embodiments" means "at least some embodiments". Relevant definitions of other terms will be given in the following description.

It should be noted that the concepts "first", "second", and the like in the present disclosure are only used for distinguishing different apparatuses, modules or units, and are not used for limiting the order or interdependence of the functions performed by these apparatuses, modules or units.

It should be noted that modifications of "one" or "a plurality" mentioned in this disclosure are intended to be illustrative rather than restrictive, and that those skilled in the art should appreciate that they should be understood as "one or more" unless otherwise explicitly stated in the context.

Names of messages or information exchanged between a plurality of devices in the embodiments of the present disclosure are for illustrative purposes only, and are not intended to limit the scope of the messages or information.

In the embodiments described below, optional features and examples are provided in each embodiment, so that each numbered embodiment should not be regarded as only one technical solution.

FIG. 1 is a schematic flowchart of an information presentation method provided by an embodiment of the present disclosure, where the method can be executed by an information presentation apparatus, the apparatus may be implemented by software and/or hardware, and may be generally integrated in an electronic device. The electronic device may be a mobile device such as a mobile phone, an intelligent watch, a tablet computer, and a personal digital assistant; and may also be another device such as a desktop computer. As shown in FIG. 1, the method comprises:

step 101, during a process of a preset application presenting a multimedia stream, detecting that a preset reminding event is triggered.

In the embodiment of the present disclosure, the type of the preset application is not limited, and may be, for example, a short video application or a live streaming application, or may be another type of application. The user may register an account in the preset application and log in. The preset application can provide a multimedia stream presentation function. The multimedia stream may include, for example, an image stream, an audio stream, a video stream, and the like, which can be presented on a multimedia stream presentation page. Generally continuous playback of multiple multimedia contents can be enabled under user operations or under default settings of the preset application. The multimedia contents may include pictures, audio, or video, and the like, and are generally presented in the form of works, such as cartoons, songs, short videos, and the like. The source and pushing mechanism of the multimedia stream may be set by the preset application according to actual requirements. Generally, the multimedia content in the multimedia stream may be published by users who log in the preset application, or may be published by a platform corresponding to the preset application. Users can upload works they want to publish to a service end corresponding to the preset application, and the service end issues the works to preset applications used by other users for presentation.

Multimedia contents in the multimedia stream are usually rich and huge in quantity, so that the phenomenon that the user is addicted to watching the multimedia stream easily occurs. In order to reduce the occurrence of this phenomenon, the user can be reminded. In the embodiment of the present disclosure, the preset reminding event may be understood as an event that reminds the user about the addiction phenomenon in the preset application. The triggering manner is not limited and can be preset. For example, the preset reminding event can be set based on an accumulated use duration or a fatigue degree of the user, and can also be set according to the time of the day for the current time, and the like.

Optionally, the detecting that a preset reminding event is triggered comprises at least one of: detecting that a duration of the current user viewing the multimedia stream using the preset application is greater than a preset duration threshold; detecting that the number of multimedia contents in the multimedia stream viewed by the current user using the preset application is larger than a preset number threshold; detecting that a value of a preset index of the current user reaches a preset index threshold, wherein the preset index is used to represent the fatigue degree of the user; or, detecting that the current time reaches a set time.

Illustratively, the duration of the current user viewing the multimedia stream using the preset application can be determined by counting a display duration of the multimedia stream presentation page, the preset duration threshold can be set according to actual requirements, for example, 2 hours, and if the duration is greater than 2 hours, it can be considered that the current user has viewed the multimedia stream for a long time, and the preset reminding event can be triggered. Similarly, when the number of the multimedia contents viewed by the user is large, the preset reminding event can also be triggered. Illustratively, the preset index can include a heart rate, a blinking frequency, a facial expression and the like, and with the user's permission, a value of the preset index can be obtained by using a preset component (such as a camera) and the like in the electronic device, the value of the preset index can also be obtained by using a device (such as a wristband or a smart watch) having a communication relationship with the electronic device, and if the value of the preset index reaches the preset index threshold, it shows that the user is tired at present, and the preset reminding event can be triggered. Illustratively, the set time can be a time in the late night or early morning, which is usually a rest time of the user, and when it is detected that the current time reaches the set time, the preset reminding event can be triggered.

Optionally, the user can set a trigger condition for the preset reminding event by himself, so that the electronic device can determine a reminding timing that fits the user's own needs more intelligently.

Step 102, presenting first multimedia content, wherein the first multimedia content includes first preset prompt content.

The first preset prompt content can be used to remind the current user to pause viewing the multimedia stream, and first preset prompt content is not limited. Illustratively, the first preset prompt content can be embodied in the form of at least one of dynamic image and text and the like, such as eye exercises animation, and a combination of text prompts of dynamic artistic words and eye protection background pictures; the first preset prompt content can also be a video of a character image dictating reminder information, and the character image can be a real character image or a virtual cartoon doll and the like, to enhance fun and friendliness. Taking the first multimedia content being a video as an example, the first preset prompt content can be understood as content for reminding the user to pause viewing the multimedia stream, which is embodied by the video picture in the video generation process.

Step 103, in a case where a switching operation acting on the first multimedia content by a current user is received, forbidding switching to second multimedia content, displaying first copywriting information, and playing first voice information matched with the first copywriting information.

The first copywriting information and the first voice information can be used to remind the current user to pause viewing the multimedia stream, and the second multimedia content is the next multimedia content in the multimedia stream.

In the embodiment of the present disclosure, the current user can be understood as a user who currently uses the preset application. The form of the switching operation is not limited, and can be, for example, a swipe operation, such as a swipe up operation or a swipe left operation, or can also be triggering a preset control for switching the multimedia content, and so on. The second multimedia content can be understood as the next multimedia content of the first multimedia content in the multimedia stream, i.e. the multimedia content following and adjacent to the first multimedia content. Generally, before the preset reminding event is triggered, when a switching operation acting on the currently presented multimedia content by the current user is received, it can be switched to present the next multimedia content.

Illustratively, the implementation of forbidding switching to the second multimedia content can be set according to actual needs. For example, the first multimedia content can be played continuously; the playing of the first multimedia content can also be paused; the display area of the first multimedia content can also be dynamically adjusted while the first multimedia content is continuously played, for example, the display area moves a preset distance from the initial display area towards the switching direction (for example, the acting direction of the switching operation), and then returns to the initial display area, so as to prompt the user that the switching of the first multimedia content is not supported currently with a dynamic effect.

Illustratively, the first copywriting information and the first voice information are used to remind the current user to pause viewing the multimedia stream, for example, remind the user to take a break or remind the user to close the preset application. The presentation form of the first copywriting information is not limited. Optionally, the first copywriting information may include a prompt bar, and the prompt bar may include at least one of text prompt information and graphic prompt information. For example, the graphic prompt information in the first copywriting information may include a dynamic image, and the dynamic image may include a dynamic portrait, and prompt is made through actions of the portrait. The first voice information is matched with the first copywriting information, the voice content in the first voice information may be consistent with the text prompt information content in the first copywriting information, and the first voice information may also be an explanation for the graphic prompt information in the first copywriting information.

Optionally, the display duration or the playback duration corresponding to the first copywriting information and the first voice information respectively can be preset, and after the corresponding preset duration, the display of at least one of the first copywriting information and the first voice information is stopped. Optionally, the preset display duration and the preset playback duration can be equal or different.

The information presentation method provided in the embodiment of the disclosure comprises, during a process of a preset application presenting a multimedia stream, detecting that a preset reminding event is triggered; presenting first multimedia content including first preset prompt content; in a case where a switching operation acting on the first multimedia content by a current user is received, forbidding switching to second multimedia content, displaying first copywriting information, and playing first voice information matched with the first copywriting information, wherein, the first copywriting information, the first voice information and the first preset prompt content are used to remind the current user to pause viewing the multimedia stream. By use of the above technical solution, during the process that the user uses the preset application to view the multimedia stream, after the preset reminding event is triggered, multimedia content including the first preset prompt content is presented, the user is forbidden to switch to the next multimedia content, copywriting information is displayed and voice information is played, and the user is reminded of stopping viewing the multimedia stream in combination with the preset prompt content, the copywriting information and the voice information, so that the perception of the user on anti-addiction can be enhanced, the reminding effect can be enhanced, and the problem that the user is easily addicted to viewing the multimedia content is solved.

In some embodiments, in a case where a switching operation acting on the first multimedia content by a current user is received, forbidding switching to second multimedia content, comprises: in a case where the switching operation acting on the first multimedia content by the current user is received, determining whether a presented duration of the first multimedia content is less than a first preset duration, based on a determination that the presented duration of the first multimedia content is less than the first preset duration, forbidding switching to the second multimedia content. Such setting has the advantages that, the control mode of forbidding switching is optimized in a time dimension, the flexibility of anti-addiction reminder is improved, which avoids the situation where the user experience is degraded due to much negative emotions caused by the fact that the user cannot realize content switching for a long time. In addition, since the first multimedia content includes first preset prompt content, in a case where the first multimedia content is less than the first preset duration, it means that the current user has viewed a small amount of first preset prompt content, at this time, switching operation is forbidden, so that the user can continuously view more first preset prompt content, the anti-addiction perception of the user is enhanced, and the reminder effect is ensured to a certain extent.

In some embodiments, after receiving a switching operation acting on the first multimedia content inputted by the current user, the method further comprises: based on the determination that the presented duration of the first multimedia content is greater than or equal to the first preset duration, switching to the second multimedia content. Such setting has the advantage that, if the current user has viewed much first preset prompt content, the user may be allowed to switch the multimedia content to avoid excessive interference on the user.

In some embodiments, at least one of the first copywriting information and the first voice information includes countdown information, and a starting value in the countdown information is the first preset duration. Such setting has the advantage that, the user can be informed of how long the content switching cannot be made in the manner of displaying dynamic countdown numbers, playing dynamic countdown images or playing countdown voices and the like, to alleviate negative emotions caused by the fact that the user cannot enable the content switching at present.

In some embodiments, the method further comprises: detecting that the preset reminding event is triggered again; presenting third multimedia content, wherein the third multimedia content includes second preset prompt content; when a switching operation acting on the third multimedia content by the current user is received, forbidding switching to fourth multimedia content, displaying second copywriting information, and playing second voice information matched with the second copywriting information; wherein, the fourth multimedia content is the next multimedia content in the multimedia stream; a reminding intensity of the second copywriting information is greater than that of the first copywriting information, and/or a reminding intensity of the second voice information is greater than that of the first voice information. Such setting has the advantage that, if the user continues to view the multimedia content after being reminded at least once, the user can be reminded continuously, and the reminding intensity is increased progressively, to enhance the reminding effect.

Illustratively, the re-triggering condition of the preset reminding event may be the same as or different from a previous triggering condition of the preset reminding event, and generally they are different. For example, the first-time trigger condition is that the duration of the current user viewing the multimedia stream using the preset application is detected to be greater than a first preset duration threshold (e.g., 2 hours), and the second-time trigger condition is that the duration of the current user viewing the multimedia stream using the preset application is detected to be greater than a second preset duration threshold (greater than the first preset duration threshold, e.g., 3 hours). It should be noted that, until the user pauses viewing the multimedia stream, the preset reminding event may be triggered multiple times, and the number of trigger times is not limited, for example, 6 times, etc. The above step of displaying the first copywriting information can correspond to any trigger except for the last one.

Illustratively, the reminding intensity may be reflected by the content in at least one of the copywriting information and the voice information. For example, the copywriting information includes a motion of a dynamic portrait, the motion in the first copywriting information may be waving hands to indicate that the user is recommended not to continue viewing, and the motion in the second copywriting information may be crossing both hands to indicate that the user is forbidden to continue viewing, so as to visually convey a stronger reminder to the user; for another example, the tone or intonation in the first voice information can be relatively gentle, and the tone or intonation in the second prompt voice information can be harsh, so as to audibly convey a stronger reminder to the user.

Optionally, the second preset prompt content included in the third multimedia content may be the same as or different from the first preset prompt content in the first multimedia content, and the second preset prompt content can be set as needed. As is understandable, by using the second preset prompt content and in conjunction with the second copywriting information and the second voice information, it is possible to achieve a stronger anti-addiction reminder.

In some embodiments, the, when a switching operation acting on the third multimedia content by the current user is received, forbidding switching to fourth multimedia content, comprises: when the switching operation acting on the third multimedia content by the current user is received, determining whether a presented duration of the third multimedia content is less than a second preset duration, based on the determination that the presented duration of the third multimedia content is less than the second preset duration, forbidding switching to the fourth multimedia content, wherein, the second preset duration is greater than the first preset duration.

In some embodiments, the preset prompt content (including the first preset prompt content and the second preset prompt content) includes a reminding video of a target character image dictating reminder information. Such setting has the advantage that, the character can be used to speak reminder information in natural language, which makes the preset prompt content more intuitive and is good for improving the reminding effect. Illustratively, the reminder information can be information in which a person corresponding to the target character image persuades the user watching the reminding video to take a rest or advises not to continue viewing the multimedia stream when recording the reminding video.

In some embodiments, the target character image is included in a preset character image set that includes a character image of a first user in the preset application, the first user having a preset association with the current user in the preset application. Such setting has the advantage that, the reminder information is presented using a character image of a user who has the preset association with the current user, so that the friendliness is enhanced, and the reminding effect is improved. Optionally, the number of the first user may be at least one, and the number of character images for the same first user may be at least one. The preset association may include the current user following the first user, and in some preset applications, the current user may also be understood as a fan of the first user; the preset association may further include the first user being a friend of the current user, and in some preset applications, it may also be understood that the current user and the first user follow each other.

Optionally, the target character image may be any character image in the preset character image set, and may also be selected according to a preset rule, wherein the preset rule is not limited, for example, random selection or selection based on the current scenario.

In some embodiments, before presenting the first multimedia content, the method further comprises: determining a target character image from the preset character image set according to historical interaction data generated in the process of the current user using the preset application; screening a target reminding video from a reminding video set of the target character image; and determining the first multimedia content to be presented according to the target reminding video. Such setting has the advantage that, a more appropriate target character image can be selected from the preset character image set according to the historical interaction data of the current user, thereby presenting more personalized first multimedia content for the current user, improving the reminding effect, and helping the user to break away from the addiction state.

Illustratively, the historical interaction data may include interaction data within a preset historical period (e.g., the last 2 hours or the last month, etc.), and may also include interaction data within the duration of the current viewing of the multimedia stream. The interaction data may include, for example, publishing users of viewed, liked, commented on, or shared multimedia contents, and may also include the time when the first user was followed, etc. The screening condition may be preset, a first user involved in the historical interaction data that meets the preset screening condition is determined as the target user, and the preset character image set is searched for the target character image of the target user. Illustratively, the preset screening condition may be a first user with the highest interaction frequency with the current user, for example, a first user who receives most likes from the current user; the preset screening condition may also be a first user who is most recently followed by the current user, and so on.

In some embodiments, the preset prompt content (including the first preset prompt content and the second preset prompt content) includes a reminding video of the character image of the second user dictating the reminder information, recorded by the preset application. Such setting has the advantage that, the user is allowed to customize personalized preset prompt content, which enriches the anti-addiction reminding function of the preset application, and helps enhance the reminding effect.

Optionally, the target character image includes a character image of a second user; the method further comprises: in an account login state of the current user, recording preset prompt content including the character image of the second user through the preset application. The second user may be the current user himself, or another user, for example, a family member or a friend of the current user, and the second user can log in an account of the current user with the permission of the current user. For example, the current user is a child, and the second user may be the child's parent. Such setting has the advantage that, the user is allowed to customize personalized preset prompt content, and for the current user, after seeing the personalized preset prompt content, the user can experience the feeling that someone familiar to him is reminding him, thereby effectively enhancing the reminding effect.

Figure 2:
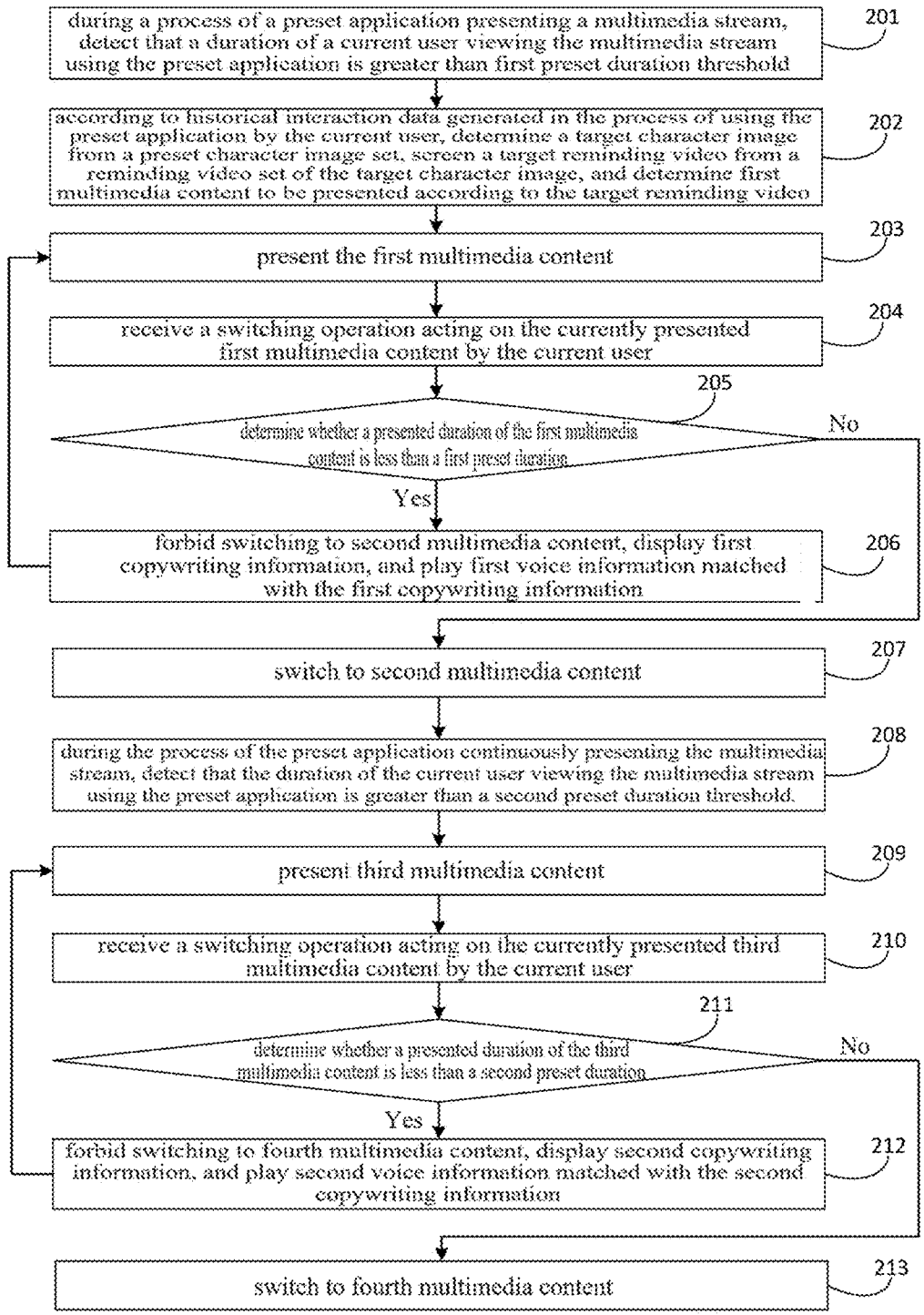
FIG. 2 is a schematic flowchart of an information presentation method provided by an embodiment of the present disclosure.

FIG. 2 is a schematic flowchart of an information presentation method provided by an embodiment of the present disclosure, where the embodiment of the present disclosure may be modified based on various alternatives in the above embodiments, and the method comprises the following steps:
- step 201, during a process of a preset application presenting a multimedia stream, detecting that a duration of a current user viewing the multimedia stream using the preset application is greater than a first preset duration threshold.

For convenience of explanation, the preset application being a short video application is taken as an example in the following. Assuming that in the process of playing a short video stream using the short video application, a duration of the current user viewing the short video stream is detected to be greater than 2 hours (the first preset duration threshold), in order to avoid the user from continuing to be addicted, a preset reminding event can be triggered to remind the current user to pause watching the short video stream.

Step 202, according to historical interaction data generated in the process of using the preset application by the current user, determining a target character image from a preset character image set, screening a target reminding video from a reminding video set of the target character image, and determining first multimedia content to be presented according to the target reminding video.

The first multimedia content includes first preset prompt content, and the first preset prompt content includes a video of the target character image dictating reminder information, to remind the current user to pause viewing the multimedia stream.

Illustratively, the preset character image set includes character images of a first user in the short video application, the first user may include a short video author followed by the current user, and the service end of the short video application may collect in advance reminding videos uploaded by different short video authors, and configure respective preset character image set for each user. Optionally, the same short video author can upload multiple reminding videos, which respectively correspond to different reminding manners, reminding styles, and reminding intensities, etc., such as different verbal tricks, different moods, or different actions, etc. The reminding videos uploaded by a same short video author can form a reminding video set. Assuming that the current user follows 10 short video authors, the corresponding preset character image set may include account IDs or character image IDs of the 10 short video authors. Assuming that the number of times that the current user likes the short video work of user A in the past one month is the largest, which means that the current user comparatively approves user A, then the reminding video of user A is more convincing to the current user, then the character image of user A can be determined as the target character image, and then a reminding video which conforms to the current scenario (for example, the preset reminding event is triggered for the first time) can be selected from the reminding video set of user A, and the reminding video is taken as the first multimedia content, or the first multimedia content is obtained by processing on the basis of the reminding video, for example, processing such as adding a related control or a link.

Step 203, presenting the first multimedia content.

Illustratively, the first multimedia content may be played in a short video stream playing page, the first multimedia content including the above-mentioned reminding video of user A.

Step 204, receiving a switching operation acting on the currently presented first multimedia content by the current user.

Figure 3:
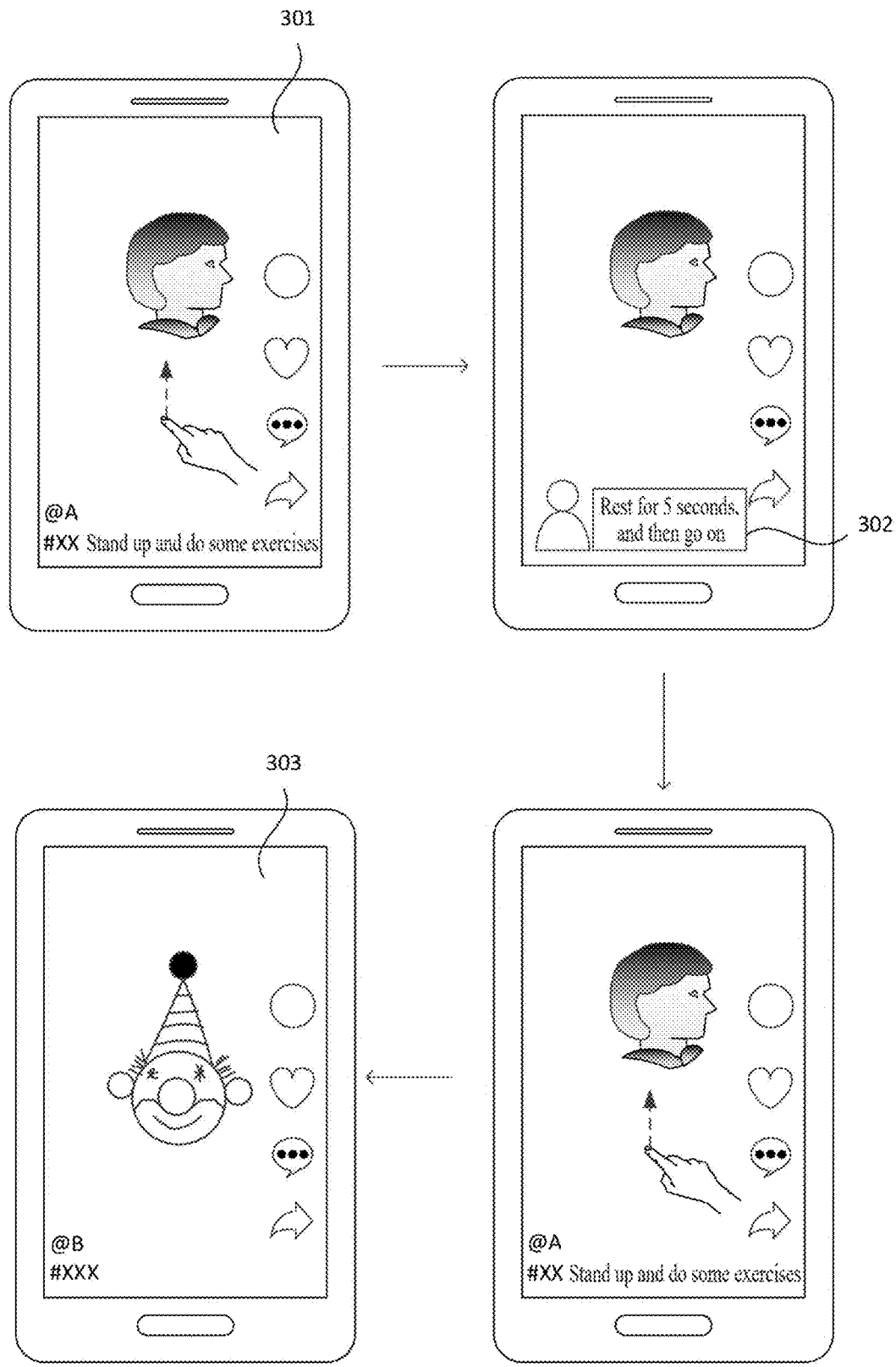
FIG. 3 is a schematic diagram of an interface of an interactive process provided by an embodiment of the present disclosure.

FIG. 3 is a schematic diagram of an interface of an interactive process provided by an embodiment of the present disclosure; as shown in FIG. 3, a short video stream playing interface is playing a reminding video of user A, that is, presenting first multimedia content 301, and at this time, when a current user wants to switch to a next short video, he can input a swipe up operation.

Step 205, determining whether a presented duration of the first multimedia content is less than a first preset duration, based on the determination that the presented duration of the first multimedia content is less than the first preset duration, executing step 206; based on the determination that the presented duration of the first multimedia content is not less than the first preset duration, executing step 207.

Illustratively, after receiving the user's swipe up operation, it is firstly determined whether the played duration of the reminding video is less than the first preset duration, based on the determination that the played duration of the reminding video is less than the first preset duration, the switching is not allowed, and based on the determination that the played duration of the reminding video is not less than the first preset duration, the next short video may be switched to. Assuming that the first preset duration is 7 seconds, if the user inputs the swipe up operation when the reminding video has been played for 2 seconds which is less than 7 seconds, the switching is not allowed.

Step 206, forbidding switching to second multimedia content, displaying first copywriting information, and playing first voice information matched with the first copywriting information, and returning to step 203.

The second multimedia content is the next multimedia content in the multimedia stream, the first copywriting information includes countdown information, and the time in the countdown information matches with a first difference that is a difference between the first preset duration and the presented duration.

As shown in FIG. 3, the short video stream playing interface will not switch to the second multimedia content, but continue to play the first multimedia content, and display the first copywriting information 302 in the form of a prompt bar. The first copywriting information 302 may include text prompt information in which countdown information may be included. When the user inputs a swipe up operation, the difference between the first preset duration and the played duration of the reminding video is 5 seconds, and at the moment, the countdown time of 5 seconds may be presented. In addition, the first copywriting information 302 may further include a prompting portrait, which can be the target character image or other preset portraits, so as to improve the reminding effect. The first voice information may be voice of the target character image, or voice of other preset characters. In addition, the prompting portrait may be played in animation mode, and combined with voice and portrait actions etc. to improve the reminding effect.

The display duration of the first copywriting information may be preset, denoted as preset display duration, for example, up to 3 seconds; in the display process, the countdown information is updated in units of seconds, as in the above example, after 1 second, "rest for 4 seconds, then go on" is displayed, after another 1 second, "rest for 3 seconds, then go on" is displayed, and so on, when the preset display duration is reached, the first prompt information disappears.

Optionally, if the first difference is less than the preset display duration when the switching operation is received, the display of the first copywriting information may be stopped when the countdown is finished, that is, when the first difference is 0. In addition, for the first voice information, after the countdown is finished, the voice information may be continuously played until to the end, to avoid the voice ending suddenly and causing confusion to the user.

Optionally, when the first copywriting information is played in the form of animation, a certain playback duration is needed, such as 1.5 seconds, and if a switching operation is received, the countdown is about to end, and if the first difference is less than the playback duration, the first copywriting information may not be played. In addition, in order to eliminate the user's confusion that the content cannot be switched, it may be allowed at this time to switch to the second multimedia content. Optionally, if the first difference is less than the playback duration, the first copywriting information may also be played, and the multimedia content is allowed to be switched at the end of the countdown, that is, the first copywriting information continues to be played to the end, at the end of and after the end of the countdown, and in the playing process, if the user inputs a switching operation, the second multimedia content can be switched to.

It should be noted that, when retuning to step 203, the first multimedia content may be presented continuously, and the presented duration of the first multimedia content continues to accumulate. In addition, if the current user closes the preset application after this step, the process may be ended.

Step 207, switching to the second multimedia content.

As shown in FIG. 3, if the countdown ends, when the current user inputs the switching operation of swipe up again, it can be detected that the presented duration of the first multimedia content is greater than or equal to 7 seconds, and at this time, the switching is allowed to present the second multimedia content 303.

Step 208, during the process of the preset application continuously presenting the multimedia stream, detecting that the duration of the current user viewing the multimedia stream using the preset application is greater than a second preset duration threshold.

Optionally, the second preset duration threshold is greater than the first preset duration threshold, for example, 3 hours. If the user continues to watch the short video stream, in order to avoid the user from continuing to be addicted, the preset reminding event may be triggered again, and the current user is reminded with stronger intensity to pause watching the short video stream.

Step 209, presenting third multimedia content.

The third multimedia content includes second preset prompt content, and the second preset prompt content includes a reminding video of the target character image dictating reminder information, to prompt the current user to pause viewing the multimedia stream again. When the reminding video is played again, the reminding video of the same target character image may be adopted to enhance the reminding continuity; reminding videos of different target character images may be also adopted, and a new target character image may be determined according to historical interaction data between the two times that the preset reminding event is triggered, to enhance the reminding diversity. In the reminding video at this time, a more severe mood or action etc. may be combined when the target character image dictates the reminder information, so that the reminding intensity is enhanced.

Step 210, receiving a switching operation acting on the currently presented third multimedia content by the current user.

Step 211, determining whether a presented duration of the third multimedia content is less than a second preset duration, based on the determination that a presented duration of the third multimedia content is less than the second preset duration, executing step 212; based on the determination that a presented duration of the third multimedia content is not less than the second preset duration, executing step 213.

Optionally, the second preset duration is greater than the first preset duration. After the preset reminding event is triggered again, the user is allowed to watch the reminding video for a longer time before the switching, to enhance the anti-addiction perception.

Step 212, forbidding switching to fourth multimedia content, displaying second copywriting information, playing second voice information matched with the second copywriting information, and returning to step 209.

The second copywriting information are displayed and the second voice information are played to remind the current user to pause viewing the multimedia stream; the fourth multimedia content is the next multimedia content in the multimedia stream, the reminding intensity of the second copywriting information is greater than that of the first copywriting information, and the reminding intensity of the second voice information is greater than that of the first voice information.

Step 213, switching to the fourth multimedia content.

In the information presentation method provided by the embodiment of the disclosure, during a process of the user using the preset application to view the multimedia stream, if it is detected that the user might be addicted, the preset reminding event can be triggered, the user is presented with a reminding video of a user who has a preset association with the user, dictating reminder information; in the process of the user watching the reminding video, the user is forbidden switching to the next multimedia content within a certain time, and the user is reminded of pausing viewing the multimedia stream in various aspects such as visually and audibly, in combination with the reminding video and the reminder information; in addition, if the preset reminding event is triggered again, the reminding intensity may be enhanced to enable progressive reminder; while feelings of dislike and anxiety of the user who cannot switch the content are reduced, the perception of anti-addiction of the user is effectively enhanced, the reminding effect can be enhanced, and the user is reminded to take a rest or exercise etc., which avoids excessive immersion in the multimedia content, and enriches the reminding function of the preset application.

Figure 4:
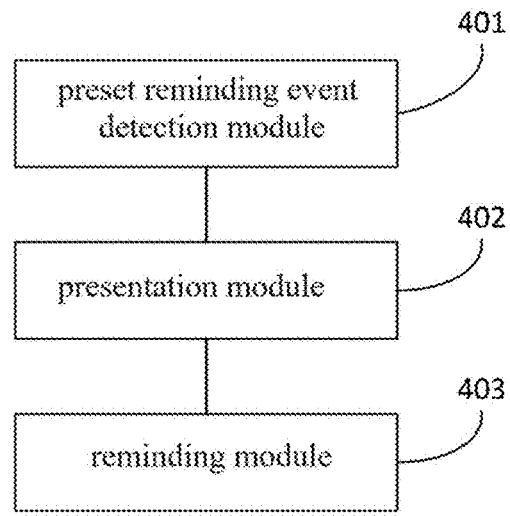
FIG. 4 is a structural block diagram of an information presentation apparatus provided by an embodiment of the present disclosure.

FIG. 4 is a structural block diagram of an information presentation apparatus provided in an embodiment of the present disclosure, where the apparatus can be implemented by software and/or hardware, can be generally integrated in an electronic device, and can perform information presentation by executing the information presentation method. As shown in FIG. 4, the apparatus comprises:

a preset reminding event detection module 401, configured to, during a process of a preset application presenting a multimedia stream, detect whether a preset reminding event is triggered;

a presentation module 402, configured to present first multimedia content after detecting that the preset reminding event is triggered, wherein, the first multimedia content includes first preset prompt content; and a reminding module 403, configured to, in a case where a switching operation acting on the first multimedia content by a current user is received, forbid switching to second multimedia content, display first copywriting information and play first voice information matched with the first copywriting information, wherein the second multimedia content is the next multimedia content in the multimedia stream.

According to the information presentation apparatus provided by the embodiment of the disclosure, during the process of a user viewing multimedia streams using a preset application, after a preset reminding event is triggered, multimedia content including first preset prompt content is presented, the user is forbidden switching to next multimedia content, copywriting information is displayed and voice information is played, and the user is reminded of pausing viewing the multimedia stream in combination with the preset prompt content, the copywriting information and the voice information, so that the perception of the user on anti-addiction can be enhanced, the reminding effect can be enhanced, and the problem that the user is easily addicted to viewing the multimedia content is solved.

Optionally, in a case where a switching operation acting on the first multimedia content by a current user is received, forbidding switching to second multimedia content, comprise: in a case where the switching operation acting on the first multimedia content by the current user is received, determining whether a presented duration of the first multimedia content is less than a first preset duration, and based on the determination that the presented duration of the first multimedia content is less than the first preset duration, forbidding switching to the second multimedia content.

Optionally, at least one of the first copywriting information and the first voice information includes countdown information, and a starting value in the countdown information is the first preset duration.

Optionally, the apparatus further comprises: a second preset reminding event detection module (the aforementioned preset reminding event detection module may be denoted as a first preset reminding event detection module), configured to detect whether the preset reminding event is triggered again; a second presentation module (the aforementioned presentation module may be denoted as a first presentation module), configured to present third multimedia content, wherein the third multimedia content includes second preset prompt content; a second reminding module (the aforementioned reminding module may be denoted as a first reminding module) configured to, in a case where a switching operation acting on the third multimedia content by the current user is received, forbid switching to fourth multimedia content, present second copywriting information and play second voice information matched with the second copywriting information; wherein the fourth multimedia content is the next multimedia content in the multimedia stream; a reminding intensity of the second copywriting information is greater than that of the first copywriting information, and/or a reminding intensity of the second voice information is greater than that of the first voice information.

Optionally, in a case where the switching operation acting on the third multimedia content by the current user is received, forbidding switching to fourth multimedia content, comprises: when the switching operation acting on the third multimedia content by the current user is received, determining whether a presented duration of the third multimedia content is less than a second preset duration, based on the determination that the presented duration of the third multimedia content is less than the second preset duration, forbidding switching to the fourth multimedia content, wherein the second preset duration is greater than the first preset duration.

Optionally, the first preset prompt content includes a reminding video of a target character image dictating reminder information.

Optionally, the target character image is included in a preset character image set which includes a character image of a first user in the preset application, the first user having a preset association with the current user in the preset application.

Optionally, the apparatus further comprises: a target character image determination module, configured to, before presenting the first multimedia content, according to historical interaction data generated during the process of using the preset application by the current user, determine a target character image from the preset character image set; a target reminding video screening module, configured to screen a target reminding video from a reminding video set of the target character image; and a content determination module, configured to determine the first multimedia content to be presented according to the target reminding video.

Optionally, the first preset prompt content includes a reminding video of a character image of a second user dictating reminder information, recorded by the preset application.

Optionally, the apparatus further comprises: a switching module configured to, after receiving a switching operation acting on the first multimedia content, inputted by the current user, based on the determination that the presented duration of the first multimedia content is greater than or equal to the first preset duration, switch to the second multimedia content.

Optionally, the detecting that a preset reminding event is triggered comprises at least one of: detecting that a duration of the current user viewing the multimedia stream using the preset application is greater than a preset duration threshold;

detecting that the number of multimedia contents in the multimedia stream viewed by the current user using the preset application is larger than a preset number threshold; detecting that a value of a preset index of the current user reaches a preset index threshold, wherein, the preset index is used to represent a fatigue degree of the user; or, detecting that the current time reaches a set time.

Figure 5:
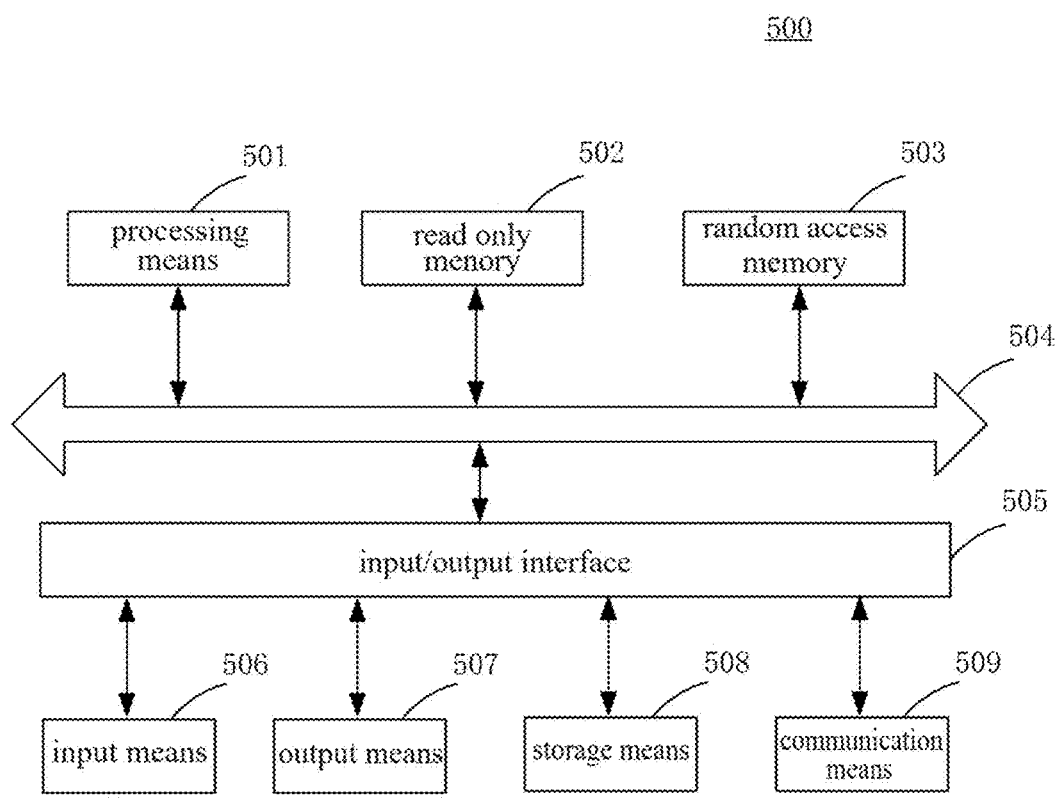
FIG. 5 is a structural block diagram of an electronic device provided by an embodiment of the present disclosure.

Referring now to FIG. 5, a structural block diagram of an electronic device 500 suitable for implementing the embodiments of the present disclosure is shown. The electronic devices in the embodiments of the present disclosure can include mobile terminals such as mobile phones, laptop computers, digital broadcast receivers, Personal Digital Assistants (PDAs), Tablets (PADs), Portable Multimedia Players (PMPs), vehicle terminals (e.g., Vehicle Navigation Terminals), etc., and fixed terminals such as digital TVs, desktop computers, etc. The electronic device shown in FIG. 5 is only an example.

As shown in FIG. 5, the electronic device 500 may include a processing means (e.g., central processing unit, graphics processing unit, etc.) 501 that may perform various appropriate actions and processes according to a program stored in a read-only memory (ROM) 502 or a program loaded from a storage means 508 into a random access memory (RAM) 503. In the RAM 503, various programs and data necessary for the operation of the electronic device 500 are also stored. The processing means 501, the ROM 502, and the RAM 503 are connected with each other by a bus 504. An input/output (I/O) interface 505 is also connected to the bus 504.

Generally, the following means may be connected to the I/O interface 505: an input means 506 including, for example, a touch screen, touch pad, keyboard, mouse, camera, microphone, accelerometer, gyroscope, or the like; an output means 507 including, for example, a liquid crystal display (LCD), speaker, vibrator, or the like; the storage means 508 including, for example, a magnetic tape, hard disk, or the like; and a communication means 509. The communication means 509 may allow the electronic device 500 to communicate wirelessly or by wire with other devices to exchange data. While FIG. 5 illustrates the electronic device 500 having various means, it should be understood that not all illustrated means are required to be implemented or provided. More or fewer means may be alternatively implemented or provided.

In particular, according to the embodiment of the present disclosure, the processes described above with reference to the flow diagrams may be implemented as a computer software program. For example, the embodiment of the present disclosure comprises a computer program product, the computer program product comprising a computer program carried on a non-transitory computer-readable medium, the computer program containing program code for performing the method illustrated by the flow diagrams. In such an embodiment, the computer program may be downloaded and installed from a network via the communication means 509, or installed from the storage means 508, or installed from the ROM 502. The computer program, when executed by the processing means 501, performs the above functions defined in the method of the embodiments of the present disclosure.

It should be noted that the above computer-readable medium of the present disclosure may be a computer-readable signal medium or a computer-readable storage medium or combination of the above two. The computer-readable storage medium may be, for example an electronic, magnetic, optical, electromagnetic, infrared, or semiconductor system, apparatus, or device, or appropriate combination thereof. Examples of the computer-readable storage medium may include an electrical connection having one or more wires, a portable computer diskette, a hard disk, a random access memory (RAM), a read-only memory (ROM), an erasable programmable read-only memory (such as Electronic Programmable Read Only Memory (EPROM) or flash memory), an optical fiber, a portable compact disc read-only memory (Compact Disc Read Only Memory (CD-ROM)), an optical storage device, a magnetic storage device, or suitable combination of the foregoing. In the present disclosure, the computer-readable storage medium may be tangible medium containing or storing a program, wherein the program can be used by or in conjunction with an instruction execution system, apparatus, or device. However, in the present disclosure, the computer-readable signal medium may include a data signal propagated in baseband or as part of a carrier wave, in which computer-readable program code is carried. Such a propagated data signal may take a variety of forms, including an electromagnetic signal, optical signal, or suitable combination of the forgoing. The computer-readable signal medium may also be any computer-readable medium other than the computer-readable storage medium, wherein the computer-readable signal medium can send, propagate, or transmit a program for use by or in conjunction with an instruction execution system, apparatus, or device. The program code contained on the computer-readable medium may be transmitted using appropriate medium, including a wire, an optical cable, Radio Frequency (RF), etc., or suitable combination of the foregoing.

The above computer-readable medium may be contained in the above electronic device; or may be exist separately without being assembled into the electronic device.

The above computer-readable medium has at least one program carried thereon, wherein the above at least one program, when executed by the electronic device, cause the electronic device to: during a process of a preset application presenting a multimedia stream, detect that a preset reminding event is triggered; present first multimedia content, wherein the first multimedia content includes first preset prompt content; and in a case where a switching operation acting on the first multimedia content by a current user is received, forbid switching to second multimedia content, display first copywriting information, and play first voice information matched with the first copywriting information, wherein the second multimedia content is the next multimedia content in the multimedia stream.

Computer program code for performing the operation of the present disclosure may be written in at least one programming languages or a combination thereof, wherein the above programming language includes an object-oriented programming language such as Java, Smalltalk, and C++, and also includes a conventional procedural programming language, such as the "C" programming language or a similar programming language. The program code may be executed entirely on a user's computer, partly on the user's computer, as a stand-alone software package, partly on the user's computer and partly on a remote computer, or entirely on the remote computer or a server. In a scenario where the remote computer is involved, the remote computer may be connected to the user's computer through any type of network, including a local area network (LAN) or a wide area network (WAN), or may be connected to an external computer (for example, through the Internet using an Internet service provider).

The flow diagrams and block diagrams in the drawings illustrate the possibly implemented architecture, functions, and operations of the system, method and computer program product according to various embodiments of the present disclosure. In this regard, each block in the flow diagrams or block diagrams may represent a module, program segment, or portion of code, which includes at least one executable instructions for implementing a specified logical function. It should also be noted that, in some alternative implementations, functions noted in blocks may occur in a different order from those noted in the drawings. For example, two blocks shown in succession may in fact be executed substantially concurrently, or the blocks may sometimes be executed in a reverse order, which depends upon the functions involved. It will also be noted that each block in the block diagrams and/or flow diagrams, and a combination of the blocks in the block diagrams and/or flow diagrams, can be implemented by a special-purpose hardware-based system that performs specified functions or operations, or a combination of special-purpose hardware and computer instructions.

The involved module described in the embodiments of the present disclosure may be implemented by software or hardware. The name of the module does not, in some cases, constitute a limitation on the module itself, for example, the preset reminding event detection module may be also described as "a module configured to detect whether a preset reminding event is triggered during a process of a preset application presenting a multimedia stream".

The functions described above herein may be executed, at least partially, by at least one hardware logic components. For example, exemplary types of the hardware logic component that may be used include: a field programmable gate array (FPGA), application specific integrated circuit (ASIC), application specific standard product (ASSP), system on chip (SOC), complex programmable logic device (CPLD), and the like.

In the context of this disclosure, a machine-readable medium may be a tangible medium, which can contain, or store a program for use by or in conjunction with an instruction execution system, apparatus, or device. The machine-readable medium may be a machine-readable signal medium or a machine-readable storage medium. The machine-readable medium may include an electronic, magnetic, optical, electromagnetic, infrared, or semiconductor system, apparatus, or device, or suitable combination of the foregoing. Examples of the machine-readable storage medium include an electrical connection based on at least one wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or suitable combination of the foregoing.

According to one or more embodiments of the present disclosure, there is provided an information presentation method, comprising:
  during a process of a preset application presenting a multimedia stream, detecting that a preset reminding event is triggered;
  presenting first multimedia content, wherein the first multimedia content includes first preset prompt content; and
  in a case where a switching operation acting on the first multimedia content by a current user is received, forbidding switching to second multimedia content, displaying first copywriting information, and playing first voice information matched with the first copywriting information, wherein the second multimedia content is the next multimedia content in the multimedia stream.

According to one or more embodiments of the present disclosure, in a case where a switching operation acting on the first multimedia content by a current user is received, forbidding switching to second multimedia content, comprises: in a case where the switching operation acting on the first multimedia content by the current user is received, determining whether a presented duration of the first multimedia content is less than a first preset duration, and based on the determination that the presented duration of the first multimedia content is less than the first preset duration, forbidding switching to the second multimedia content.

According to one or more embodiments of the present disclosure, at least one of the first copywriting information and the first voice information includes countdown information, wherein a starting value in the countdown information is the first preset duration.

According to one or more embodiments of the present disclosure, the method further comprises: detecting that the preset reminding event is triggered again; presenting third multimedia content, wherein the third multimedia content includes second preset prompt content; when a switching operation acting on the third multimedia content by the current user is received, forbidding switching to fourth multimedia content, presenting second copywriting information, and playing second voice information matched with the second copywriting information; wherein, the fourth multimedia content is the next multimedia content in the multimedia stream; a reminding intensity of the second copywriting information is greater than that of the first copywriting information, and/or a reminding intensity of the second voice information is greater than that of the first voice information.

According to one or more embodiments of the present disclosure, when a switching operation acting on the third multimedia content by the current user is received, forbidding switching to fourth multimedia content, comprises: when the switching operation acting on the third multimedia content by the current user is received, determining whether a presented duration of the third multimedia content is less than a second preset duration, and based on the determination that the presented duration of the third multimedia content is less than the second preset duration, forbidding switching to the fourth multimedia content, wherein the second preset duration is greater than the first preset duration.

According to one or more embodiments of the present disclosure, the first preset prompt content includes a reminding video of a target character image dictating reminder information, the target character image is included in a preset character image set which includes a character image of a first user in the preset application, the first user having a preset association with the current user in the preset application; wherein, before presenting the first multimedia content, the method further comprises: determining a target character image from the preset character image set according to historical interaction data generated during the process of using the preset application by the current user; screening a target reminding video from a reminding video set of the target character image; and determining the first multimedia content to be presented according to the target reminding video.

According to one or more embodiments of the present disclosure, the first preset prompt content includes a reminding video of a character image of a second user dictating reminder information, recorded by the preset application.

According to one or more embodiments of the present disclosure, after receiving a switching operation acting on the currently presented first multimedia content, inputted by the current user, the method further comprises: based on the determination that the presented duration of the first multimedia content is greater than or equal to the first preset duration, switching to the second multimedia content.

According to one or more embodiments of the present disclosure, the detecting that a preset reminding event is triggered comprises at least one of: detecting that a duration of the current user viewing the multimedia stream using the preset application is greater than a preset duration threshold; detecting that the number of multimedia contents in the multimedia stream viewed by the current user using the preset application is larger than a preset number threshold; detecting that a value of a preset index of the current user reaches a preset index threshold, wherein the preset index is used to represent a fatigue degree of the user; or, detecting that the current time reaches a set time.

According to one or more embodiments of the present disclosure, there is provided an information presentation apparatus, comprising:
- a preset reminding event detection module configured to, during a process of a preset application presenting a multimedia stream, detect whether a preset reminding event is triggered;
- a presentation module configured to present first multimedia content after detecting that the preset reminding event is triggered, wherein the first multimedia content includes first preset prompt content; and
- a reminding module configured to, in a case where a switching operation acting on the first multimedia content by a current user is received, forbid switching to second multimedia content, display first copywriting information and play first voice information matched with the first copywriting information, wherein the second multimedia content is the next multimedia content in the multimedia stream.

What is claimed is:

1. An information presentation method, comprising:
    during a process of a preset application presenting a multimedia stream, detecting that a preset reminding event is triggered;
    in response to the triggering of the preset reminding event, presenting first multimedia content, wherein the first multimedia content includes preset prompt content associated with the preset reminding event for anti-addiction; and
    in response to a switching operation acting on the first multimedia content by a current user is received, forbidding switching to second multimedia content, displaying first copywriting information, and playing first voice information matched with the first copywriting information, wherein the second multimedia content is the next multimedia content in the multimedia stream,
    in response to a switching operation acting on the first multimedia content by a current user is received, forbidding switching to second multimedia content, comprises:
        in response to the switching operation acting on the first multimedia content by the current user is received, determining whether a presented duration of the first multimedia content is less than a first preset duration, and if yes, forbidding switching to the second multimedia content.

2. The method according to claim 1, wherein the first copywriting information and/or first speech information includes countdown information, and a starting value in the countdown information is the first preset duration.

3. The method according to claim 2, further comprising:
    detecting that the preset reminding event is triggered again;
    presenting third multimedia content, wherein the third multimedia content include preset prompt content; and
    in response to a switching operation acting on the third multimedia content by the current user is received, forbidding switching to fourth multimedia content, displaying second copywriting information and playing second voice information matched with the second copywriting information, wherein, the fourth multimedia content is the next multimedia content in the multimedia stream; a reminding intensity of the second copywriting information is greater than that of the first copywriting information, and/or a reminding intensity of the second voice information is greater than that of the first voice information.

4. The method according to claim 3, wherein in response to a switching operation acting on the third multimedia content by the current user is received, forbidding switching to fourth multimedia content, comprises:
    in response to the switching operation acting on the third multimedia content by the current user is received, determining whether a presented duration of the third multimedia content is less than a second preset duration, and if yes, forbidding switching to the fourth multimedia content, wherein, the second preset duration is greater than the first preset duration.

5. The method according to claim 1, wherein the preset prompt content includes a reminding video of a target character image dictating reminder information, the target character image is included in a preset character image set which includes character images of a first user in the preset application, the first user having a preset association with the current user in the preset application
    wherein before the presenting the first multimedia content, further comprising:
    determining a target character image from the preset character image set according to historical interaction data generated during the process of using the preset application by the current user;
    screening a target reminding video from a reminding video set of the target character image; and
    determining the first multimedia content to be presented according to the target reminding video.

6. The method according to claim 1, wherein the preset prompt content includes a reminding video of a character image of a second user dictating reminder information, recorded by the preset application.

7. The method according to claim 1, further comprising, after receiving the switching operation acting on the first multimedia content input by the current user:
    if the presented duration of the first multimedia content is greater than or equal to the first preset duration, switching to the second multimedia content.

8. The method according to claim 1, wherein the detecting that a preset reminding event is triggered comprises at least one of:
    detecting that a duration of the current user viewing the multimedia stream using the preset application is greater than a preset duration threshold;

detecting that a number of multimedia contents in the multimedia stream viewed by the current user using the preset application is larger than a preset number threshold;

detecting that a value of a preset index of the current user reaches a preset index threshold, wherein, the preset index is used to represent a fatigue degree of the user; or detecting that a current time reaches a set time.

9. An electronic device comprising a memory, a processor and a computer program stored on the memory and executable by the processor, the computer program, when executed by the processor, causes the processor to implement an information presentation method, comprising:

during a process of a preset application presenting a multimedia stream, detecting that a preset reminding event is triggered;

in response to the triggering of the preset reminding event, presenting first multimedia content, wherein the first multimedia content includes preset prompt content associated with the preset reminding event for anti-addiction; and in response to a switching operation acting on the first multimedia content by a current user is received, forbidding switching to second multimedia content, displaying first copywriting information, and playing first voice information matched with the first copywriting information, wherein the second multimedia content is the next multimedia content in the multimedia stream, in response to a switching operation acting on the first multimedia content by a current user is received, forbidding switching to second multimedia content, comprises:

in response to the switching operation acting on the first multimedia content by the current user is received, determining whether a presented duration of the first multimedia content is less than a first preset duration, and if yes, forbidding switching to the second multimedia content.

10. The electronic device according to claim 9, wherein the first copywriting information and/or the first speech information includes countdown information, and a starting value in the countdown information is the first preset duration.

11. The electronic device according to claim 10, the computer program further causes the processor to implement the method comprising:

detecting that the preset reminding event is triggered again;

presenting third multimedia content, wherein the third multimedia content include preset prompt content; and in response to a switching operation acting on the third multimedia content by the current user is received, forbidding switching to fourth multimedia content, displaying second copywriting information and playing second voice information matched with the second copywriting information, wherein, the fourth multimedia content is the next multimedia content in the multimedia stream; a reminding intensity of the second copywriting information is greater than that of the first copywriting information, and/or a reminding intensity of the second voice information is greater than that of the first voice information.

12. The electronic device according to claim 11, in response to a switching operation acting on the third multimedia content by the current user is received, forbidding switching to fourth multimedia content, the computer program further causes the processor to implement the method comprising:

in response to the switching operation acting on the third multimedia content by the current user is received, determining whether a presented duration of the third multimedia content is less than a second preset duration, and if yes, forbidding switching to the fourth multimedia content, wherein, the second preset duration is greater than the first preset duration.

13. The electronic device according to claim 9, wherein the preset prompt content includes a reminding video of a target character image dictating reminder information, the target character image is included in a preset character image set which includes character images of a first user in the preset application, the first user having a preset association with the current user in the preset application, wherein before the presenting the first multimedia content, the computer program further causes the processor to implement the method comprising:

determining a target character image from the preset character image set according to historical interaction data generated during the process of using the preset application by the current user;

screening a target reminding video from a reminding video set of the target character image; and determining the first multimedia content to be presented according to the target reminding video.

14. The electronic device according to claim 9, wherein the preset prompt content includes a reminding video of a character image of a second user dictating reminder information, recorded by the preset application.

15. The electronic device according to claim 9, after receiving the switching operation acting on the first multimedia content input by the current user, the computer program further causes the processor to implement the method comprising:

if the presented duration of the first multimedia content is greater than or equal to the first preset duration, switching to the second multimedia content.

16. The electronic device according to claim 9, wherein the detecting that a preset reminding event is triggered comprises at least one of:

detecting that a duration of the current user viewing the multimedia stream using the preset application is greater than a preset duration threshold;

detecting that a number of multimedia contents in the multimedia stream viewed by the current user using the preset application is larger than a preset number threshold;

detecting that a value of a preset index of the current user reaches a preset index threshold, wherein, the preset index is used to represent a fatigue degree of the user; or detecting that a current time reaches a set time.

17. A non-transitory computer-readable storage medium having a computer program stored thereon, the computer program, when executed by the processor, implements an information presentation method, comprising:

during a process of a preset application presenting a multimedia stream, detecting that a preset reminding event is triggered;

in response to the triggering of the preset reminding event, presenting first multimedia content, wherein the first multimedia content includes preset prompt content associated with the preset reminding event for anti-addiction; and in response to a switching operation acting on the first multimedia content by a current user is received, forbidding switching to second multimedia content, displaying first copywriting information, and playing first voice information matched with the first copywriting information, wherein the second multimedia content is the next multimedia content in the multimedia stream, in response to a switching operation acting on the first multimedia content by a current user is received, forbidding switching to second multimedia content, comprises:

in response to the switching operation acting on the first multimedia content by the current user is received, determining whether a presented duration of the first multimedia content is less than a first preset duration, and if yes, forbidding switching to the second multimedia content.

18. The non-transitory computer-readable storage medium according to claim 17, wherein the first copywriting information and/or the first speech information includes countdown information, and a starting value in the countdown information is the first preset duration.

19. The non-transitory computer-readable storage medium according to claim 18, the computer program further causes the processor to implement the method comprising:

detecting that the preset reminding event is triggered again;

presenting third multimedia content, wherein the third multimedia content include preset prompt content; and in response to a switching operation acting on the third multimedia content by the current user is received, forbidding switching to fourth multimedia content, displaying second copywriting information and playing second voice information matched with the second copywriting information, wherein, the fourth multimedia content is the next multimedia content in the multimedia stream; a reminding intensity of the second copywriting information is greater than that of the first copywriting information, and/or a reminding intensity of the second voice information is greater than that of the first voice information.

20. The non-transitory computer-readable storage medium according to claim 19, in response to a switching operation acting on the third multimedia content by the current user is received, forbidding switching to fourth multimedia content, the computer program further causes the processor to implement the method comprising:

in response to the switching operation acting on the third multimedia content by the current user is received, determining whether a presented duration of the third multimedia content is less than a second preset duration, and if yes, forbidding switching to the fourth multimedia content, wherein, the second preset duration is greater than the first preset duration.

* * * * *